(12) United States Patent
Lin et al.

(10) Patent No.: US 10,167,389 B2
(45) Date of Patent: Jan. 1, 2019

(54) POLYPHENYLENE ETHER RESIN COMPOSITION

(71) Applicant: GRAND TEK ADVANCE MATERIAL SCIENCE CO., LTD., Taipei (TW)

(72) Inventors: Hsueh-Tso Lin, Hsinchu (TW); Zhi-Yong Wang, Taipei (TW); Dick Zhong, Arcadia, CA (US)

(73) Assignee: GRAND TEK ADVANCE MATERIAL SCIENCE CO., LTD., Taipei (TW)

(*) Notice: Subject to any disclaimer, the term of this patent is extended or adjusted under 35 U.S.C. 154(b) by 107 days.

(21) Appl. No.: 15/495,252

(22) Filed: Apr. 24, 2017

(65) Prior Publication Data
US 2018/0273752 A1    Sep. 27, 2018

(30) Foreign Application Priority Data

Mar. 27, 2017    (TW) .............. 106110106 A

(51) Int. Cl.
| | |
|---|---|
| *C08L 71/12* | (2006.01) |
| *C08F 212/08* | (2006.01) |
| *C08F 212/36* | (2006.01) |
| *C08F 212/34* | (2006.01) |
| *C08F 226/06* | (2006.01) |
| *C08L 25/18* | (2006.01) |
| *C08L 25/08* | (2006.01) |
| *C08F 212/12* | (2006.01) |
| *C08L 25/16* | (2006.01) |

(52) U.S. Cl.
CPC .......... *C08L 71/126* (2013.01); *C08F 212/08* (2013.01); *C08F 212/12* (2013.01); *C08F 212/34* (2013.01); *C08F 212/36* (2013.01); *C08F 226/06* (2013.01); *C08L 25/08* (2013.01); *C08L 25/16* (2013.01); *C08L 25/18* (2013.01); *C08L 71/12* (2013.01)

(58) Field of Classification Search
None
See application file for complete search history.

(56) References Cited

FOREIGN PATENT DOCUMENTS

| CN | 1402750 A | 3/2003 | |
|---|---|---|---|
| CN | 104130565 A | 11/2014 | |
| JP | 57104101 A * | 6/1982 | ............... G02B 1/04 |
| JP | 6-179734 A | 6/1994 | |
| JP | 06179734 A * | 6/1994 | |

* cited by examiner

*Primary Examiner* — Richard A Huhn

(74) *Attorney, Agent, or Firm* — Muncy, Geissler, Olds & Lowe, P.C.

(57) ABSTRACT

Polyphenylene ether resin composition includes 100 parts by weight of polyphenylene ether resin, 25 to 40 parts by weight of copolymer, and 0.01 to 0.02 parts by weight of initiator. The copolymer is (A) copolymer polymerized of (a) mono-functional monomer, (b1) bi-functional monomer, and (c) tri-functional monomer through radical polymerization, (B) copolymer polymerized of (a) mono-functional monomer and (b2) bi-functional monomer through radical polymerization, or (C) a combination thereof.

9 Claims, No Drawings

POLYPHENYLENE ETHER RESIN COMPOSITION

CROSS REFERENCE TO RELATED APPLICATIONS

This Application claims priority of Taiwan Patent Application No. 106110106, filed on Mar. 27, 2017, the entirety of which is incorporated by reference herein.

BACKGROUND

Technical Field

The disclosure relates to a polyphenylene ether resin composition.

Description of the Related Art

The high-frequency technology has entered the daily life. The requirements on frequency have increased as electronic transfer speeds have accelerated, thereby increasing the requirements on electronic materials. For example, not only are excellent processability and mechanical properties required, but a low dielectric constant, low dielectric loss, and excellent heat resistance of electronic materials are also needed. Polyphenylene ether is a high-performance resin having a good symmetric molecular chain, lower intermolecular interaction, and high aromatic group ratio. As such, the polyphenylene ether has excellent dielectric properties such as a low dielectric constant and low dielectric loss, thereby satisfying the requirements of dielectric properties for high-frequency application. Simultaneously, the polyphenylene ether has a higher glass transition temperature, low water absorption, and excellent impact toughness, thereby having broad application in high-frequency laminate plate materials in the future. However, polyphenylene ether resin with a high molecular weight (e.g. greater than 10000) has shortcomings such as poor solubility, poor compatibility with epoxy resin, and high melting viscosity. Therefore, the reliability of the laminate plate of certain polyphenylene ethers is seriously influenced by its insufficient heat resistance, low adhesiveness, and poor size stability.

For overcoming the problems caused by polyphenylene ether with high molecular weight, a polyphenylene ether resin composition with a low dielectric constant can be utilized, which is formed by the polyphenylene ether with a low molecular weight and a curing agent 1,3,5-triallylisocyanurate (TAIC). The TAIC is easily vaporized during processing due to its lower boiling point, and the polyphenylene ether resin composition containing the TAIC has shortcomings such as a lower glass transition temperature. The lower glass transition temperature of the polyphenylene ether resin composition may negatively influence the heat resistance and lifespan of a copper clad laminate utilizing the polyphenylene ether resin composition.

Styrene (and derivatives thereof) and divinyl monomer have lower polarity than those of the TAIC or 1,3,5-triallylcyanurate (TAC), which are suitable to be radical polymerization monomers. As such, the styrene-based monomer and the divinyl monomer may serve as the crosslinking components of the polyphenylene ether resin. However, the styrene-based monomer and the divinyl monomer are vaporizable, such that the prepreg including the same has a short gelling period, and the laminated plate including the prepreg has an unstable glass transition temperature.

Accordingly, a novel crosslinking agent or curing agent is called for to be collocated with the polyphenylene ether resin to overcome the above problems.

BRIEF SUMMARY

One embodiment of the disclosure provides a polyphenylene ether resin composition, comprising: 100 parts by weight of polyphenylene ether resin; 25 to 40 parts by weight of copolymer; and 0.01 to 0.02 parts by weight of initiator, wherein the copolymer is (A) copolymer polymerized of (a) mono-functional monomer, (b1) bi-functional monomer, and (c) tri-functional monomer through radical polymerization; (B) copolymer polymerized of (a) mono-functional monomer and (b2) bi-functional monomer through radical polymerization, or (C) a combination thereof; wherein (a) mono-functional monomer comprises styrene, α-methyl styrene, 4-methyl styrene, or a combination thereof; (b1) bi-functional monomer comprises bisphenol A dimethacrylate, divinylbenzene, 1,3-diisopropenylbenzene, or a combination thereof; (b2) bi-functional monomer comprises a combination of (b21) o-diallyl phthalate and (b22) bisphenol A dimethacrylate, divinylbenzene, 1,3-diisopropenyl benzene, or a combination thereof; and (c) tri-functional monomer comprises 1,3,5-triallylisocyanurate, 1,3,5-triallylcyanurate, or a combination thereof.

A detailed description is given in the following embodiments.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

In one embodiment, a polyphenylene ether resin composition is provided, which includes 100 parts by weight of polyphenylene ether resin; 25 to 40 parts by weight of copolymer; and 0.01 to 0.02 parts by weight of initiator. The polyphenylene ether resin can be further cured, e.g. the polyphenylene ether resin and the copolymer are crosslinked by the initiator to form a product. Too much copolymer may result in a poor flowability of the polyphenylene ether resin composition, thereby degrading the operability of the polyphenylene ether resin composition. Too little copolymer is equal to too much polyphenylene ether resin, such that the crosslinking density of the reactants is lowered. Too little initiator may reduce the crosslinking density of the reactants, and further lower the Tg of a laminated plate including the resin composition. Too much initiator may result in a difficult operation due to an overly fast reaction rate.

In one embodiment, the polyphenylene ether resin is polyphenylene ether resin with a terminal group of methacryloxy group, polyphenylene ether resin with a terminal group of vinyl benzyl ether group, or a combination thereof. In one embodiment, the polyphenylene ether resin has a weight average molecular weight of 1500 to 5000 and a polymer dispersity index (PDI) of 1.4 to 1.7. A polyphenylene ether resin with an overly high weight average molecular weight results in an overly high viscosity of the resin composition, such that the impregnation of the resin composition is difficult. Moreover, the resin composition in the impregnated product cannot easily flow, such that the adhesion between the layers is poor, causing dry plate. A polyphenylene ether resin with an overly low weight average molecular weight may lower the dielectric properties of the laminated plate. A polyphenylene ether resin with an overly high PDI may negatively influence the dielectric properties of the product and the resin flowability.

The copolymer is (A) copolymer polymerized of (a) mono-functional monomer, (b1) bi-functional monomer, and (c) tri-functional monomer through radical polymerization; (B) copolymer polymerized of (a) mono-functional monomer and (b2) bi-functional monomer through radical polymerization, or (C) a combination thereof. The number average molecular weight of the copolymer can be controlled to be 3000 to 6000 through a molecular weight modulator in the polymerization, thereby avoiding the monomer vaporization and ensuring the flowability of the copolymer.

In one embodiment, the copolymer can be prepared by mixing the monomers, initiator, solvent, and molecular weight modulator under nitrogen, and reacting at 60° C. to 80° C. for 4 to 6 hours. The weight of the initiator and the total weight of the monomers have a ratio of 0.1 wt % to 3 wt %. The solvent (e.g. toluene or xylene) may control the monomer concentration at 30 wt % to 50 wt %. The molecular weight modulator (e.g. α-methyl styrene dimer) and the monomers have an equivalent ratio of 1:5 to 1:20.

When the copolymer is (A) copolymer polymerized of (a) mono-functional monomer, (b1) bi-functional monomer, and (c) tri-functional monomer through radical polymerization, (a) mono-functional monomer may include styrene, α-methyl styrene, 4-methyl styrene, or a combination thereof (b1) bi-functional monomer may include bisphenol A dimethacrylate, divinylbenzene, 1,3-diisopropenylbenzene, or a combination thereof (c) tri-functional monomer may include 1,3,5-triallylisocyanurate (TAIC), 1,3,5-triallylcyanurate (TAC), or a combination thereof. In a certain embodiment, (a) mono-functional monomer and (b1) bi-functional monomer have a weight ratio of 100:40 to 100:300, and (a) mono-functional monomer and (c) tri-functional monomer have a weight ratio of 100:40 to 100:300. Too much (b1) bi-functional monomer will make it difficult to polymerize the tri-functional monomer because the allyl monomer cannot be radically polymerized to each other. Too little (b1) bi-functional monomer may result in a poor polymerization effect and dielectric properties of the product. Too much (c) tri-functional monomer may negatively influence the polymerization effect. Too little (c) tri-functional monomer may lower the crosslinking density of the product and the flowability of the resin composition.

When the copolymer is (B) copolymer polymerized of (a) mono-functional monomer and (b2) bi-functional monomer through radical polymerization, (a) mono-functional monomer may include styrene, α-methyl styrene, 4-methyl styrene, or a combination thereof (b2) Bi-functional monomer may include a combination of (b21) o-diallyl phthalate and (b22) bisphenol A dimethacrylate, divinylbenzene, 1,3-diisopropenyl benzene, or a combination thereof. In this embodiment, (a) mono-functional monomer and (b2) bi-functional monomer have a weight ratio of 100:200 to 100:600. The polymerization is more difficult to control with too much (b2) bi-functional monomer. Too little (b2) bi-functional monomer results in a lower crosslinking density, thereby negatively influencing the glass transition temperature of the laminated plate. In one embodiment, (b21) o-diallyl phthalate and (b22) bisphenol A dimethacrylate, divinylbenzene, 1,3-diisopropenyl benzene, or a combination thereof have a weight ratio of 100:200 to 100:1100. The resin composition may have a poor flowability due to too little (b21) o-diallyl phthalate. The laminated plate of the resin composition may have a poor moisture and heat resistance due to too much (b21) o-diallyl phthalate.

In one embodiment, the initiator can be benzoyl peroxide (BPO), dicumyl peroxide, di-t-butyl peroxide, di(t-butylperoxyisopropyl)benzene, or a combination thereof. The initiator may efficiently initiate the polymerization at a corresponding temperature gradient, and ensure the physical and chemical properties of the prepreg and the related circuit board material satisfy the application requirements.

In one embodiment, the polyphenylene ether resin composition may further be 20 to 40 parts by weight of flame retardant. The flame retardant is not limited to a specific type, and can be any one that satisfies the flame retardant requirements. For example, the flame retardant can be bromine-based flame retardant such as 1,2-Bis(pentabromophenyl) ethane and the like, or phosphorous and nitrogen-based flame retardant such as cyclic phenoxyphosphazene compound and the like.

In one embodiment, the polyphenylene ether resin composition may further include 0.5 to 1 part by weight of silane coupling agent and 20 to 40 parts by weight of silicon oxide. The silane coupling agent can be (3-epoxypropoxy propyl) trimethoxysilane, (3-epoxypropoxy propyl) triethoxysilane, 3-(methacryloxy)propyl trimethoxysilane, or a combination thereof. The silane coupling agent may form a molecular bridge at an interface between an inorganic substance and an organic substance, which may connect two materials with dramatically different properties, therefore enhancing the properties of the composite and increasing the adhering strength. In one embodiment, the 3-(methacryloxy)propyl trimethoxysilane is selected. The silicon oxide with low dielectric constant (e.g. fused quartz powder) added to the polyphenylene ether resin composition is beneficial to reducing the thermal expansion coefficient of the cured resin composition and lowering the cost of the product.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

The names and the sources of the chemicals are listed below, but the chemicals are not limited thereto.

The polyphenylene ether resin with a terminal group of methacryloxy group was NORYL RESIN SA 9000 commercially available from SABIC.

The flame retardant was SAYTEX 8010 (with Br content of 82.3%) commercially available from ALBEMARLE ASANO.

The silane coupling agent was Dynasylan MEMO commercially available from EVONIK.

The fused quartz powder was MEGASIL 525 commercially available from SIBELCO.

The glass fiber cloth was E type 2116 commercially available from Taiwan Glass Group.

Preparation of Copolymer

Preparation Example 1

25 g of styrene, 10 g of divinylbenzene, 10 g of TAIC, 0.5 g of benzoyl peroxide (BPO) serving as initiator, 5 g of α-methyl styrene dimer, and 50 g of toluene were mixed under nitrogen and reacted at 60° C. for 6 hours to obtain a copolymer with a solid content of 50%.

Preparation Example 2

5 g of styrene, 15 g of bisphenol A dimethacrylate, 15 g of TAIC, 0.5 g of BPO initiator, 5 g of α-methyl styrene dimer, and 40 g of toluene were mixed under nitrogen and reacted at 70° C. for 5 hours to obtain a copolymer with a solid content of 50%.

Preparation Example 3

15 g of styrene, 15 g of divinylbenzene, 15 g of TAIC, 0.5 g of BPO initiator, 5 g of α-methyl styrene dimer, and 50 g of toluene were mixed under nitrogen and reacted at 80° C. for 4 hours to obtain a copolymer with a solid content of 50%.

Preparation Example 4

5 g of styrene, 5 g of α-methyl styrene, 5 g of bisphenol A dimethacrylate, 25 g of TAIC, 0.5 g of BPO initiator, 3.5 g of α-methyl styrene dimer, and 40 g of toluene were mixed under nitrogen and reacted at 80° C. for 4 hours to obtain a copolymer with a solid content of 50%.

Preparation Example 5

10 g of styrene, 20 g of o-diallyl phthalate, 10 g of bisphenol A dimethacrylate, 30 g of 1,3-diisopropylbenzene, 0.5 g of BPO initiator, 5 g of α-methyl styrene dimer, and 75 g of toluene were mixed under nitrogen and reacted at 80° C. for 4 hours to obtain a copolymer with a solid content of 50%.

Preparation Example 6

12.5 g of styrene, 2.5 g of o-diallyl phthalate, 5 g of bisphenol A dimethacrylate, 17.5 g of 1,3-diisopropylbenzene, 5 g of divinylbenzene, 0.25 g of BPO initiator, 2.5 g of α-methyl styrene dimer, and 45 g of toluene were mixed under nitrogen and reacted at 80° C. for 4 hours to obtain a copolymer with a solid content of 50%.

Preparation Example 7

15 g of styrene, 5 g of o-diallyl phthalate, 22.5 g of 1,3-diisopropylbenzene, 5 g of divinylbenzene, 0.25 g of BPO initiator, 2.5 g of α-methyl styrene dimer, and 50 g of toluene were mixed under nitrogen and reacted at 80° C. for 4 hours to obtain a copolymer with a solid content of 50%.

Comparative Preparation Example 1

10 g of styrene, 10 g of bisphenol A dimethacrylate, 30 g of 1,3-diisopropenylbenzene, 0.5 g of BPO initiator, 5 g of α-methyl styrene dimer, and 55 g of toluene were mixed under nitrogen and reacted at 80° C. for 4 hours to obtain a copolymer with a solid content of 50%.

Comparative Preparation Example 2

5 g of styrene, 20 g of bisphenol A dimethacrylate, 15 g of TAIC, 0.5 g of BPO initiator, 5 g of α-methyl styrene dimer, and 45 g of toluene were mixed under nitrogen and reacted at 70° C. for 5 hours to obtain a copolymer with a solid content of 50%.

Comparative Preparation Example 3

10 g of styrene, 25 g of o-diallyl phthalate, 15 g of bisphenol A dimethacrylate, 15 g of 1,3-diisopropenylbenzene, 10 g of divinylbenzene, 0.5 g of BPO initiator, 5 g of α-methyl styrene dimer, and 75 g of toluene were mixed under nitrogen and reacted at 80° C. for 4 hours to obtain a copolymer with a solid content of 50%.

Comparative Preparation Example 4

12 g of styrene, 15 g of o-diallyl phthalate, 2.5 g of divinylbenzene, 0.5 g of BPO initiator, 5 g of α-methyl styrene dimer, and 35 g of toluene were mixed under nitrogen and reacted at 80° C. for 4 hours to obtain a copolymer with a solid content of 50%.

TABLE 1

|  | Preparation Example 1 | Preparation Example 2 | Preparation Example 3 | Preparation Example 4 |
|---|---|---|---|---|
| Styrene | 25 | 5 | 15 | 5 |
| α-Methyl styrene | / | / | / | 5 |
| Divinylbenzene | 10 | / | 15 | / |
| Bisphenol A dimethacrylate | / | 15 | / | 5 |
| TAIC | 10 | 15 | 15 | 25 |
| α-Methyl styrene dimer | 5 | 5 | 5 | 3.5 |
| Toluene | 50 | 40 | 50 | 40 |
| BPO | 0.5 | 0.5 | 0.5 | 0.5 |

|  | Preparation Example 5 | Preparation Example 6 | Preparation Example 7 | Comparative Preparation Example 1 | Comparative Preparation Example 2 | Comparative Preparation Example 3 | Comparative Preparation Example 4 |
|---|---|---|---|---|---|---|---|
| Styrene | 10 | 12.5 | 15 | 10 | 5 | 10 | 12 |
| o-Diallyl phthalate | 20 | 2.5 | 5 |  |  | 25 | 15 |
| Bisphenol A dimethacrylate | 10 | 5 |  | 10 | 20 | 15 |  |
| 1,3-diisopropenyl benzene | 30 | 17.5 | 22.5 | 30 |  | 15 |  |
| Divinylbenzene |  | 5 | 5 |  |  | 10 | 2.5 |
| TAIC |  |  |  |  | 15 |  |  |

TABLE 1-continued

| α-Methyl styrene dimer | 5 | 2.5 | 2.5 | 5 | 5 | 5 | 5 |
|---|---|---|---|---|---|---|---|
| Toluene | 75 | 45 | 50 | 55 | 45 | 75 | 35 |
| BPO | 0.5 | 0.25 | 0.25 | 0.5 | 0.5 | 0.5 | 0.5 |

Example 1

100 g of polyphenylene ether (SA9000) and 100 g of toluene were mixed to completely dissolve the polyphenylene ether. Subsequently, 50 g of the copolymer (with a solid content of 50%) in Preparation Example 1, 20 g of the flame retardant (SAYTEX 8010), 0.5 g of silane coupling agent (Dynasylan MEMO), 20 g of fused quartz powder (MEGASIL 525), 0.02 g of the BPO initiator, and 100 g of toluene were added to the polyphenylene ether solution to be evenly mixed.

Example 2

100 g of polyphenylene ether (SA9000) and 100 g of toluene were mixed to completely dissolve the polyphenylene ether. Subsequently, 60 g of the copolymer (with a solid content of 50%) in Preparation Example 2, 40 g of the flame retardant (SAYTEX 8010), 1 g of silane coupling agent (Dynasylan MEMO), 40 g of fused quartz powder (MEGASIL 525), 0.02 g of the BPO initiator, and 100 g of toluene were added to the polyphenylene ether solution to be evenly mixed.

Example 3

100 g of polyphenylene ether (SA9000) and 100 g of toluene were mixed to completely dissolve the polyphenylene ether. Subsequently, 70 g of the copolymer (with a solid content of 50%) in Preparation Example 3, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Example 4

100 g of polyphenylene ether (SA9000) and 100 g of toluene were mixed to completely dissolve the polyphenylene ether. Subsequently, 80 g of the copolymer (with a solid content of 50%) in Preparation Example 4, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Example 5

100 g of polyphenylene ether (SA9000) and 100 g of toluene were mixed to completely dissolve the polyphenylene ether. Subsequently, 75 g of the copolymer (with a solid content of 50%) in Preparation Example 5, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Example 6

100 g of polyphenylene ether (SA9000) and 100 g of toluene were mixed to completely dissolve the polyphenylene ether. Subsequently, 50 g of the copolymer (with a solid content of 50%) in Preparation Example 6, 35 g of the flame retardant (SAYTEX 8010), 1 g of silane coupling agent (Dynasylan MEMO), 35 g of fused quartz powder (MEGASIL 525), 0.02 g of the BPO initiator, and 100 g of toluene were added to the polyphenylene ether solution to be evenly mixed.

Example 7

100 g of polyphenylene ether (SA9000) and 100 g of toluene were mixed to completely dissolve the polyphenylene ether. Subsequently, 80 g of the copolymer (with a solid content of 50%) in Preparation Example 7, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Comparative Example 1

100 g of polyphenylene ether (SA9000) and 100 g of toluene were mixed to completely dissolve the polyphenylene ether. Subsequently, a mixture liquid of 40 g of TAIC and 40 g of toluene, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Comparative Example 2

100 g of polyphenylene ether (SA9000) and 100 g of toluene were mixed to completely dissolve the polyphenylene ether. Subsequently, a mixture liquid of 40 g of divinylbenzene and 40 g of toluene, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed. In the process, below, for manufacturing the prepreg, the divinylbenzene was vaporized during the baking at 170° C., such that the prepreg could not be formed.

Comparative Example 3

100 g of polyphenylene ether (SA9000) and 100 g of toluene were mixed to completely dissolve the polyphenylene ether. Subsequently, 80 g of the copolymer (with a solid content of 50%) in Comparative Preparation Example 1, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Comparative Example 4

100 g of polyphenylene ether (SA9000) and 100 g of toluene were mixed to completely dissolve the polyphenylene ether. Subsequently, 80 g of the copolymer (with a solid content of 50%) in Comparative Preparation Example 2, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Comparative Example 5

100 g of polyphenylene ether (SA9000) and 100 g of toluene were mixed to completely dissolve the polyphenylene ether. Subsequently, 80 g of the copolymer (with a solid content of 50%) in Comparative Preparation Example 3, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Comparative Example 6

100 g of polyphenylene ether (SA9000) and 100 g of toluene were mixed to completely dissolve the polyphenylene ether. Subsequently, 80 g of the copolymer (with a solid content of 50%) in Comparative Preparation Example 4, 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

Comparative Example 7 (the Monomers were Only Mixed Rather than Polymerized)

100 g of polyphenylene ether (SA9000) and 100 g of toluene were mixed to completely dissolve the polyphenylene ether. Subsequently, 50 g of the monomer mixture liquid in Preparation Example 1 (mixture liquid of 12.5 g of styrene, 5 g of divinylbenzene, 5 g of TAIC, 2.5 g of α-methyl styrene dimer, and 25 g of toluene), 20 g of the flame retardant (SAYTEX 8010), 0.5 g of silane coupling agent (Dynasylan MEMO), 20 g of fused quartz powder (MEGASIL 525), 0.02 g of the BPO initiator, and 100 g of toluene were added to the polyphenylene ether solution to be evenly mixed.

Comparative Example 8 (the Monomers were Only Mixed Rather than Polymerized)

100 g of polyphenylene ether (SA9000) and 100 g of toluene were mixed to completely dissolve the polyphenylene ether. Subsequently, 75 g of the monomer mixture liquid in Preparation Example 5 (mixture liquid of 5 g of styrene, 10 g of o-diallyl phthalate, 5 g of bisphenol A dimethacrylate, 15 g of 1,3-diisopropenylbenzene, 2.5 g of α-methyl styrene dimer, and 37.5 g of toluene), 32 g of the flame retardant (SAYTEX 8010), 1 g of silane coupling agent (Dynasylan MEMO), 32 g of fused quartz powder (MEGASIL 525), 0.02 g of the BPO initiator, and 100 g of toluene were added to the polyphenylene ether solution to be evenly mixed.

TABLE 2

|  | Example 1 | Example 2 | Example 3 | Example 4 | Example 5 | Example 6 | Example 7 |
|---|---|---|---|---|---|---|---|
| Polyphenylene ether | 100 | 100 | 100 | 100 | 100 | 100 | 100 |
| Copolymer in Preparation Example 1 (solid content 50%) | 50 | / | / | / | / | / | / |
| Copolymer in Preparation Example 2 (solid content 50%) | / | 60 | / | / | / | / | / |
| Copolymer in Preparation Example 3 (solid content 50%) | / | / | 70 | / | / | / | / |
| Copolymer in Preparation Example 4 (solid content 50%) | / | / | / | 80 | / | / | / |
| Copolymer in Preparation Example 5 (solid content 50%) | / | / | / | / | 75 | / | / |
| Copolymer in Preparation Example 6 (solid content 50%) | / | / | / | / | / | 50 | / |
| Copolymer in Preparation Example 7 (solid content 50%) | / | / | / | / | / | / | 80 |
| Flame retardant | 20 | 40 | 32 | 32 | 32 | 35 | 32 |
| Silane coupling agent | 0.5 | 1 | 1 | 1 | 1 | 1 | 1 |
| Fused quartz powder | 20 | 40 | 32 | 32 | 32 | 35 | 32 |

TABLE 2-continued

| | | | | | | | | |
|---|---|---|---|---|---|---|---|---|
| Toluene | 200 | 200 | 200 | 200 | 200 | 200 | 200 | |
| Initiator (BPO) | 0.02 | 0.02 | 0.02 | 0.02 | 0.02 | 0.02 | 0.02 | |

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Polyphenylene ether | 100 | 100 | 100 | 100 | 100 | 100 | 100 | 100 |
| TAIC | 40 | / | / | / | / | / | / | / |
| Divinylbenzene | / | 40 | / | / | / | / | / | / |
| Copolymer in Comparative Preparation Example 1 (solid content 50%) | | | 80 | | | | | |
| Copolymer in Comparative Preparation Example 2 (solid content 50%) | | | | 80 | | | | |
| Copolymer in Comparative Preparation Example 3 (solid content 50%) | | | | | 80 | | | |
| Copolymer in Comparative Preparation Example 4 (solid content 50%) | | | | | | 80 | | |
| Monomer mixture liquid in Preparation Example 1 (solid content 50%) | | | | | | | 50 | |
| Monomer mixture liquid in Preparation Example 5 (solid content 50%) | | | | | | | | 75 |
| Flame retardant | 32 | 32 | 32 | 32 | 32 | 32 | 20 | 32 |
| Silane coupling agent | 1 | 1 | 1 | 1 | 1 | 1 | 0.5 | 1 |
| Fused quartz powder | 32 | 32 | 32 | 32 | 32 | 32 | 20 | 32 |
| Toluene | 240 | 240 | 200 | 200 | 200 | 200 | 200 | 200 |
| Initiator (BPO) | 0.02 | 0.02 | 0.02 | 0.02 | 0.02 | 0.02 | 0.02 | 0.02 |

Method of Manufacturing Copper Clad Laminate

The resin composition (from Examples or Comparative Examples) was mixed with other components to prepare prepreg gel. The prepreg gel was filtered by sieve (100 to 200 mesh), and the glass fiber cloth was impregnated into the filtered prepreg gel by an impregnator, in which the gel content of the impregnated glass fiber cloth was controlled to 50±2%. The impregnated glass fiber cloth was baked at 170 for 2 to 3 minutes to prepare a prepreg. The six prepregs were stacked and two copper foils were put on two sides of the stack for being laminated at 210° C. for 150 minutes by a pressure of 200 psi. As such, a copper clad laminate was obtained. The properties of the copper clad laminates corresponding to the resin compositions from Examples and Comparative Examples are listed in Table 3.

TABLE 3

| Properties | Example 1 | Example 2 | Example 3 | Example 4 | Example 5 | Example 6 | Example 7 |
|---|---|---|---|---|---|---|---|
| Glass transition temperature (Tg/° C.) | 179 | 187 | 187 | 189 | 200 | 195 | 188 |
| Peel strength (PS/lb/inch) | 7.8 | 8.1 | 7.4 | 7.8 | 7.0 | 7.0 | 6.8 |
| Solder dipping heat resistance period (min) | 5 | 5 | 5 | 5 | 5 | 5 | 5 |
| Moisture and heat resistance (PCT/2 h) | Pass | Pass | Pass | Pass | Pass | Pass | Pass |
| Dielectric constant (2 GHz) | 3.45 | 3.55 | 3.43 | 3.53 | 3.59 | 3.56 | 3.65 |
| Dielectric loss (2 GHz) | 0.0028 | 0.0029 | 0.0028 | 0.0022 | 0.0022 | 0.0028 | 0.0028 |

TABLE 3-continued

| Properties | Comparative Example 1 | Comparative Example 3 | Comparative Example 4 | Comparative Example 5 | Comparative Example 6 | Comparative Example 7 | Comparative Example 8 |
|---|---|---|---|---|---|---|---|
| Glass transition temperature (Tg/° C.) | 170 | 170 | 141 | 173.53 | 165 | 156.51 | 151.92 |
| Peel strength (PS/lb/inch) | 5.2 | 6.8 | 6.1 | 6.5 | 5.1 | 6.1 | 7.1 |
| Solder dipping heat resistance period (min) | 5 | 5 | 5 | 5 | 5 | 5 | 5 |
| Moisture and heat resistance (PCT/2 h) | Pass | Pass | Pass | Pass | Pass | Pass | Pass |
| Dielectric constant (2 GHz) | 3.86 | 3.73 | 3.81 | 3.76 | 3.89 | 3.72 | 3.80 |
| Dielectric loss (2 GHz) | 0.0041 | 0.0043 | 0.0046 | 0.0042 | 0.0062 | 0.0036 | 0.0046 |

As shown in Table 3, the polyphenylene ether resin composition in the examples of the disclosure had excellent peel strength, high heat resistance, and low dielectric constant and dielectric loss. Compared to the comparative examples, the polyphenylene ether resin composition in the examples had higher Tg.

The tests of the examples above according to the standards below.

The glass transition temperature (Tg) was tested by the IPC standard IPC-TM-650-2.4.25 (TMA method).

The peel strength (PS) was tested by the after-thermal-stress condition in IPC standard IPC-TM-650-2.4.8 to test the peel strength of the metal cap layer.

The solder dipping heat resistance: two-sided copper samples (50 mm×50 mm) were dipped in a solder bath of 288° C. to record the delaminating and bubbling time of the samples.

The moisture and heat resistance (pressure cooker test, PCT): The copper clad laminate (CCL, with a thickness of 0.8 mm) having two copper foils (each had a thickness of 18 μm) on the top and bottom of the CCL was etched to obtain a sample with an area of 5 cm×5 cm. The sample was dried at 115° C. for 20 hours, then continuously cooked in a pressure cooker under 0.105 MPa at 121° C. for 120 minutes, and then dipped in a solder bath of 288° C. for 30 seconds to check whether the sample delaminated.

The dielectric constant and dielectric loss: The dielectric constant and dielectric loss of the sample plate (70 mm×3.5 mm×0.75 mm) at a frequency of 2 GHz were tested by the Resonant Cavity method of JIS-Compliant C 2565 using a Japan AET instrument.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polyphenylene ether resin composition, comprising: 100 parts by weight of polyphenylene ether resin; 25 to 40 parts by weight of copolymer; and 0.01 to 0.02 parts by weight of initiator, wherein the copolymer is
(A) copolymer polymerized of (a) mono-functional monomer, (b1) bi-functional monomer, and (c) tri-functional monomer through radical polymerization;
(B) copolymer polymerized of (a) mono-functional monomer and (b2) bi-functional monomer through radical polymerization, or
(C) a combination thereof;
wherein (a) mono-functional monomer comprises styrene, α-methyl styrene, 4-methyl styrene, or a combination thereof;
(b1) bi-functional monomer comprises bisphenol A dimethacrylate, divinylbenzene, 1,3-diisopropenylbenzene, or a combination thereof;
(b2) bi-functional monomer comprises a combination of (b21) diallyl phthalate and (b22) bisphenol A dimethacrylate, divinylbenzene, 1,3-diisopropenyl benzene, or a combination thereof; and
(c) tri-functional monomer comprises 1,3,5-triallylisocyanurate, triallylcyanurate, or a combination thereof.

2. The polyphenylene ether resin composition as claimed in claim 1, wherein the polyphenylene ether resin is polyphenylene ether resin with a terminal group of methacryloxy group, polyphenylene ether resin with a terminal group of vinyl benzyl ether group, or a combination thereof.

3. The polyphenylene ether resin composition as claimed in claim 1, wherein the polyphenylene ether resin has a weight average molecular weight of 1500 to 5000 and a polymer dispersity index of 1.4 to 1.7.

4. The polyphenylene ether resin composition as claimed in claim 1, wherein the copolymer has a number average molecular weight of 3000 to 6000.

5. The polyphenylene ether resin composition as claimed in claim 1, wherein the copolymer is (A) copolymer polymerized of (a) mono-functional monomer, (b1) bi-functional monomer, and (c) tri-functional monomer through radical polymerization, and (a) mono-functional monomer and (b1) bi-functional monomer have a weight ratio of 100:40 to 100:300, and (a) mono-functional monomer and (c) tri-functional monomer have a weight ratio of 100:40 to 100:300.

6. The polyphenylene ether resin composition as claimed in claim 1, wherein the copolymer is (B) copolymer polymerized of (a) mono-functional monomer and (b2) bi-functional monomer through radical polymerization, and (a) mono-functional monomer and (b2) bi-functional monomer have a weight ratio of 100:200 to 100:600.

7. The polyphenylene ether resin composition as claimed in claim 6, wherein (b21) diallyl phthalate and (b22) bisphenol A dimethacrylate, divinylbenzene, 1,3-diisopropenylbenzene, or a combination thereof have a weight ratio of 100:200 to 100:1100.

8. The polyphenylene ether resin composition as claimed in claim 1, further comprising 20 to 40 parts by weight of flame retardant.

9. The polyphenylene ether resin composition as claimed in claim 1, further comprising 0.5 to 1 part by weight of silane coupling agent and 20 to 40 parts by weight of silicon oxide.

* * * * *